UNITED STATES PATENT OFFICE.

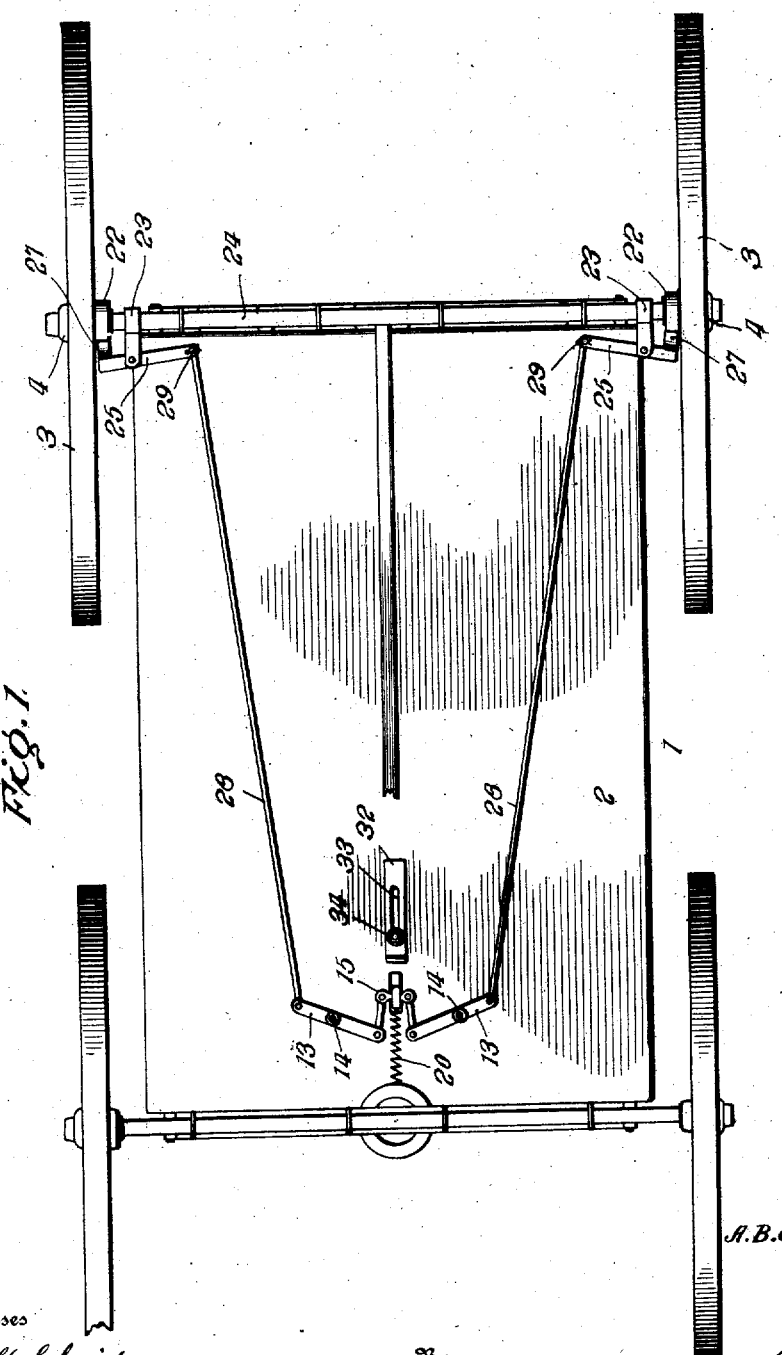

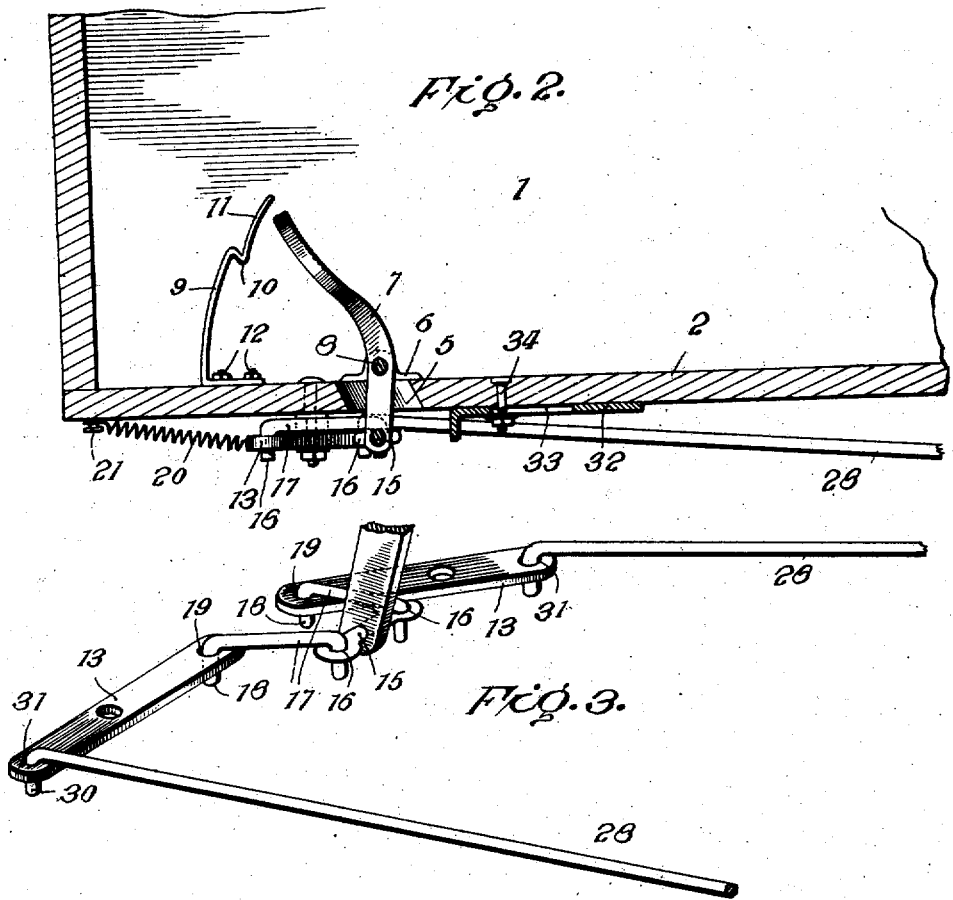

ALFRED B. CALDWELL, OF EVANSVILLE, INDIANA.

VEHICLE-BRAKE.

No. 853,496.  Specification of Letters Patent.  Patented May 14, 1907.

Application filed January 17, 1907. Serial No. 352,668.

*To all whom it may concern:*

Be it known that I, ALFRED B. CALDWELL, a citizen of the United States, residing at Evansville, in the county of Vanderburg and State of Indiana, have invented new and useful Improvements in Vehicle-Brakes, of which the following is a specification.

My invention relates to certain new and useful improvements in vehicle brakes, and it has for its object the production of a brake of simple construction and inexpensive in cost of manufacture, and which may be readily applied to any character of vehicle without necessitating material changes in the body or running gear.

A further object is the production of a brake which is equally well adapted for use on vehicles having metal or rubber tires, and which when used on the lighter class of vehicles will not detract from the appearance of the same.

Referring to the accompanying drawings wherein I show the preferred form of my invention and wherein the same part is designated by the same reference numeral wherever it occurs.

Figure 1 is a bottom plan view of a vehicle showing my invention applied thereto; Fig. 2 is a longitudinal section of the forward end of the vehicle provided with my invention; Fig. 3 is a detail perspective view of the forward portion of my brake mechanism and Fig. 4 is a section through the hub of the rear wheel, showing the brake band on the hub and the brake shoe.

1 designates a vehicle body of any ordinary desired form, and 2 designates the bottom of the body. 3 designates the rear wheels of the vehicle and 4 the hubs of the wheels. These parts are of any ordinary or desired construction.

In the bottom 2 of the body I cut a slot 5 and adjacent to the side of the slot I mount a lug 6 in which is pivoted the lever 7 by means of a pivot 8. The lever 7 forms the foot lever of the brake, and one end of the lever extends up in convenient position to be operated by foot of the driver while the lower end extends down through the slot 5 beneath the bottom 2.

9 designates a spring detent provided with a catch 10, and a portion 11 extending above the catch. This spring is secured to the bottom 2 of the body adjacent to the foot lever 7 by means of the bolts 12 or any other suitable securing means. The spring detent is in such position that when the lever 7 is fully pressed down the catch 10 will engage over the end of the lever 7 and hold the same and thus hold the brake fully applied. By pressing the end of the foot against the projecting portion of the detent the brake can be readily released.

13 are a pair of levers pivoted to the under side of the bottom 2 by means of the bolts 14 or other form of pivot. These levers are mounted on each side of the lower end of the foot lever 7, and 15 is a cross head secured in the lower end of the lever 7 and provided with eyes 16, one on each end thereof. 17 are links, each preferably and as shown, formed of a rod having downturned ends 18, one end of which is adapted to enter an eye 16 in the cross head 15, the other end of which is adapted to engage an opening 19 in the inner ends of the levers 13.

20 is a spring one end of which is connected to the lower end of the lever 7 with its othe ed to the lower end of the lever 7 with its other end connected by suitable fastening means 21 to the body of the vehicle.

On the inner side of each of the rear hubs 4 I mount, by shrinking, or any other desired way, a ring 22, with which the brake shoe contacts. The ring can be mounted on any ordinary form of hub and does not require any special construction of the hub.

23 are a pair of yokes mounted on the rear axle 24 of the vehicle adjacent to each of the hubs 4. In the outer end of each of these yokes is pivoted a lever 25 by means of a bolt 26 or other suitable means. 26' is a second bolt which, with the bolt 26, holds the yoke in position on the axle. At the outer end each of the levers 25 carries a brake shoe 27 which is adapted to make contact with the ring 22.

28 are rods each of which is connected to the inner end of the levers 25 by means of a down-turned end passing through an opening in the lever and held in position by a cotter pin 29. The other end of the rods is turned down to form a hook 30 which is adapted to enter an opening 31 in the outer end of the levers 13. It is obvious, however, that if desired other forms of connection for the various rods and levers may be substituted for that shown and described.

When my brake is used on a vehicle having a rubber tire, it is essential that the brake be prevented from being applied with such force as to prevent the wheel from turning and cause the wheel to slide. I accordingly provide an adjustable stop which can be so set as to limit the movement of the foot lever 7 and prevent a pressure being applied by the brake shoe which will be sufficient to cause the rear wheels to slide. As shown, this means consists of an angle plate 32, provided with a slot 33, adjustably mounted on the bottom 2 of the body by means of a bolt 34 passing through the bottom 2 and the slot 33, the angular end of the plate 32 being located in the rear of the lower end of the foot lever 7 whereby it may be set up so as to stop the movement of the lever in the direction to apply the brake as much as may be necessary.

From the above description it will be seen that I have produced a brake which is simple in construction and direct in its operation, and one which may be applied to any of the ordinary forms of vehicles, the application being made either during the building of the vehicle or after it is completed.

While I have described what I believe to be the preferred form of my invention, I desire to have it understood that many changes may be made in the form, construction and arrangement of parts without departing from the spirit of my invention.

What I claim as new and desire to secure by Letters Patent is

1. A vehicle brake comprising a foot lever pivoted to the vehicle body, a pair of levers pivoted to the vehicle body one on each side of the foot lever, links connecting one end of each of said pair of levers to the foot lever, a second pair of levers one pivoted adjacent to the hub of each rear wheel and each provided at one end with a brake shoe adapted to contact with each hub, and rods connecting the other end of said last mentioned levers with said first mentioned levers.

2. A vehicle brake comprising a foot lever pivoted to the vehicle body, a pair of levers pivoted to the vehicle body one on each side of the foot lever, links connecting one end of each of said pair of levers to the foot lever, a pair of yokes surrounding the rear axle one adjacent to each wheel, a lever pivoted in each yoke, a brake shoe adapted to contact with the hub mounted on one end of each lever and rods connecting the other end of each lever to the first mentioned pair of levers.

3. A vehicle brake comprising a foot lever pivoted to the vehicle body, a pair of levers pivoted on each side of the foot lever, links connecting one end of each of said pair of levers to the foot lever, a second pair of levers one pivoted adjacent to the hub of each rear wheel and each provided at one end with a brake shoe, a flat band mounted on each hub with which said shoe is adapted to contact, and rods connecting the other end of said last mentioned levers with said first mentioned levers.

4. In a vehicle brake the combination with a brake shoe, of a foot lever adapted to operate the shoe, a detent formed of spring metal adapted to catch over the end of the lever when the brake is substantially fully applied to hold the same, said detent having one end provided with means by which it is fixedly secured to the bottom of the vehicle and the other end of the detent being provided with a projection adapted to be engaged by the foot of the operator to release the brake.

In testimony whereof I have affixed my signature, in presence of two subscribing witnesses.

ALFRED B. CALDWELL.

Witnesses:
F. L. BROWNE,
FRANCIS M. PHELPS.